United States Patent
Swope et al.

(10) Patent No.: US 6,961,790 B2
(45) Date of Patent: Nov. 1, 2005

(54) SELF-EXTRACTING RE-CONFIGURABLE INTERFACE USED IN MODULAR ELECTRONIC ARCHITECTURE

(75) Inventors: Charles B. Swope, Coral Springs, FL (US); James S. Mitrosky, Margate, FL (US); Timothy D. Houston, Plantation, FL (US)

(73) Assignee: Motorola, Inc., Schaumburg, IL (US)

(*) Notice: Subject to any disclaimer, the term of this patent is extended or adjusted under 35 U.S.C. 154(b) by 493 days.

(21) Appl. No.: 09/895,506

(22) Filed: Jun. 29, 2001

(65) Prior Publication Data

US 2003/0005192 A1  Jan. 2, 2003

(51) Int. Cl.$^7$ ............................................ G06F 13/00
(52) U.S. Cl. ........................... 710/104; 710/8; 710/10; 710/11; 710/16; 713/100
(58) Field of Search ............................. 710/104, 8, 10, 710/11, 16; 713/100

(56) References Cited

U.S. PATENT DOCUMENTS

| | | | | |
|---|---|---|---|---|
| 4,825,404 A | * | 4/1989 | Theus | 710/104 |
| 5,119,498 A | * | 6/1992 | McNeill et al. | 710/104 |
| 5,530,895 A | * | 6/1996 | Enstrom | 710/9 |
| 5,613,092 A | * | 3/1997 | Lim et al. | 710/301 |
| 6,049,222 A | * | 4/2000 | Lawman | 326/38 |
| 6,054,846 A | * | 4/2000 | Castleman | 323/283 |
| 6,138,180 A | * | 10/2000 | Zegelin | 710/11 |
| 6,189,052 B1 | * | 2/2001 | Nilsson et al. | 710/48 |
| 6,216,191 B1 | * | 4/2001 | Britton et al. | 710/305 |
| 6,349,235 B1 | * | 2/2002 | Gibart et al. | 700/11 |
| 6,385,667 B1 | * | 5/2002 | Estakhri et al. | 710/8 |
| 6,418,486 B1 | * | 7/2002 | Lortz et al. | 710/10 |
| 6,466,994 B1 | * | 10/2002 | Burke et al. | 710/8 |
| 6,484,215 B1 | * | 11/2002 | Gibart et al. | 710/9 |
| 6,484,216 B1 | * | 11/2002 | Zegelin | 710/11 |
| 6,484,219 B1 | * | 11/2002 | Dunn et al. | 710/42 |
| 6,609,195 B2 | * | 8/2003 | Dover | 713/100 |
| 6,687,814 B1 | * | 2/2004 | Duppong | 713/1 |
| 2001/0045861 A1 | * | 11/2001 | Bloodworth et al. | 327/525 |
| 2002/0040412 A1 | * | 4/2002 | Estakhri et al. | 710/11 |
| 2002/0095533 A1 | * | 7/2002 | Esterberg et al. | 710/8 |
| 2004/0049610 A1 | * | 3/2004 | Esterberg et al. | 710/8 |

OTHER PUBLICATIONS

Swan, Richard, et al., "Re-Configurable Computing," last modified Jan. 21, 2001, ACM Crossroads, Article No. 1, p. 1-17.*

Bergmann, Neil W., et al., "Adaptive Interfacing with Reconfigurable Computers," Jan. 29-30, 2001, IEEE Computer Society, p. 11-18.*

Stiliadis, Dimitrios, et al., "A Reconfigurable Hardware Approach to Network Simulation," 1997, ACM Press, p. 131-156.*

* cited by examiner

*Primary Examiner*—Rehana Perveen
*Assistant Examiner*—Donna K. Mason
(74) *Attorney, Agent, or Firm*—Barbara R. Doutre

(57) ABSTRACT

A re-configurable interface used in modular electronic architectures includes a host (203) and one or more modules (201) for interfacing with the host (203) to provide additional functionality. A configuration controller (209) located in the host (203) is for reading a memory device (215) located in the module (201) for providing configuration information to the host. The pin controller (209) then is able to reconfigure pins of the host connector (207) to communicate with the module (201).

12 Claims, 1 Drawing Sheet

SELF-EXTRACTING RE-CONFIGURABLE INTERFACE USED IN MODULAR ELECTRONIC ARCHITECTURE

TECHNICAL FIELD

This invention relates in general to configuration of modulator architectures and more specifically to re-configurable architectures in electronic systems.

BACKGROUND

Many different types of electrical products today are modular and include one or more interface units to increase and/or enhance the operational characteristics of the product. These types of products generally have a dedicated type of interface module meaning the interface unit is specifically designed to be electrically integrated with a host device through the use of some type of electrical connector or the like. Each module must be designed such that the interface will be electrically compatible with the connector on the host device.

As seen in prior art FIG. 1, the typical modular interface system 100 would include a module 101 that may be a stand alone accessory device or similar interfacing with a host device 105. The module 101 includes a module connector 103 that interfaces with a corresponding host connector 107 on the host device 105. The module connector 103 and host connector 107 connect through as dedicated serial interface 109. The dedicated serial interface 109 connects one or more dedicated serial pins allowing the module 101 to communicate with the host device 105. The remainder of the pins are configured to form a dedicated pin interface 111 in these connectors to provide communication and compatibility between the module 101 and host device 105. An example of such an arrangement might be a remote control head used for a mobile public service radio. The control head communicates through the dedicated serial interface 109 while one or more additional pins are dedicated to other control or communications functions.

The difficulty with this arrangement is that the dedicated pin interface 111 used for each module 101 cannot be reconfigured such that other modular or peripheral devices connected to the host 105 must now absolutely conform to the pin arrangement used by the host device in order to be compatible. This can lead to great difficulty since interface devices (not shown) must be configured between the module 101 and host 105 in order for the module to interface properly and be fully functional.

Thus, the need exists to provide a re-configurable interface system that can self-extract module or accessory configuration information from a module or accessory interface enabling any interface module to electrically interface and/or communicate with a host device.

DETAILED DESCRIPTION OF THE PREFERRED EMBODIMENT

Figure 1:
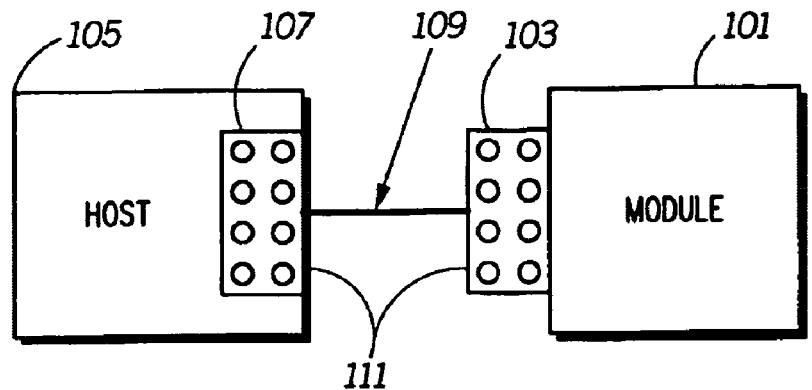
FIG. 1 is a block diagram illustrating the prior art interface system.
Figure 2:
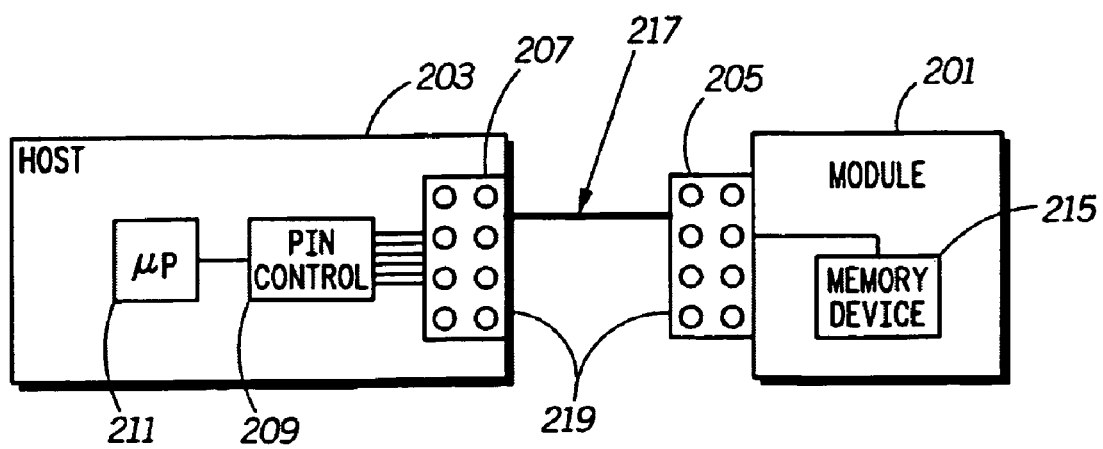
FIG. 2 is a block diagram illustrating the self-extracting re-configurable interface used in modular electronic architectures according to the preferred embodiment of the invention.

Referring now to FIG. 2, a re-configurable interface system 200 used in modular architectures according to the preferred embodiment of the invention includes a secondary module 201 and primary host device 203. The secondary module 201 generally provides some increased functionality to the primary host device 203 and connects through corresponding and/or mating connectors such as the module connector 205 and host connector 207. The secondary module 201 may include a cable connected device or a modular type device physically integrated within an electrical connector. The pin configuration of host connector 207 is controlled by a pin controller 209. The pin controller 209, although generally controlled by an accompanying microprocessor 211, may also be integrated within a microprocessor device with portions of that device being appropriately programmed to control pin configuration.

Those skilled in the art will further recognize that any type of associated programmable logic can also provide the same function to microprocessor 211 and may also be used. The pin controller 209 would read configuration information or data from the memory device 215 through the dedicated pin interface 217. Although a single memory device 215 is shown and described herein, any number of memory devices associated with the module 201 may be used.

In operation, the pin controller 209 receives pin configuration information, that is unique to each module 201. The microprocessor 211 can work to interpret this configuration information to configure and/or electrically arrange the pins of the host connector 207 into any desired configuration in order to provide communications capability between devices. Generally, the pin interface 219 will be in a dedicated state until initialization process. At this time, all of the pins of host connector 207 may be reconfigured to interface with any desired module device 201. Additionally it should be noted that the pins providing voltage potential (B+) (not shown) to the microprocessor 211 will also be dedicated, however these pins can also easily be reconfigured.

One example of such an arrangement might be an accessory that attaches to the host device such as a two-way radio. In accordance with the preferred embodiment of the invention, any fixed pin arrangement of the accessory would not be a hindrance since the host device 203 is able to reconfigure the pins on host connector 207 in order to accommodate and communicate with the accessory. It is the great benefit of this invention that all that is required to establish communication is for the host and module connectors to inter-connect in order to communicate. Thus, any module 201 having an associated memory device 215, communicating configuration information to pin controller 209 can be compatible. This enables any type of module such as an accessory device to be used with the host device 203 without the need for constant "hard" wire interface compatibility. Moreover, no prior knowledge of connection information is required by software contained within the host 203.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A re-configurable interface used in modular electronic architectures comprising:
    a host;
    at least one module for interfacing with the host to provide additional functionality to the host, the host having no prior configuration information pertaining to the at least one module;
    a configuration controller located in the host for reading at least one memory device located in the at least one module for providing configuration information to the host;
    a configurable logic operating with the configuration controller for configuring a host interface to operate with an at least one module interface; and
    a plurality of connector pins at the host and at least one module that are electrically configured using the configurable logic.

2. A re-configurable interface as in claim 1, wherein the configuration controller self-extracts the configuration information from the at least one memory device after interfacing with the at least one module with the host.

3. A re-configurable interface as in claim 1, further including a dedicated serial interface for exchanging information from the at least one memory device to the configuration controller.

4. A re-configurable interface as in claim 1, further including a microprocessor for communicating with the configuration controller.

5. A re-configurable electronic interface system for providing communication between a primary host device and a secondary accessory device comprising:
    an interface controller including re-configurable logic associated with the primary host device, the primary host device having no prior configuration information pertaining to the secondary accessory device;
    at least one memory device associated with the secondary accessory device for communicating configuration information to the interface controller;
    a plurality of electrical interface pins for connecting the primary host device and the secondary accessory device; and
    wherein the interface controller sets the re-configurable logic of the re-configurable electronic interface system based on information from the at least one memory device for allowing compatibility between the secondary accessory device and the primary host device by configuring the plurality of electrical interface pins according to the re-configurable logic.

6. A re-configurable electronic interface system as in claim 5, wherein the interface controller self-extracts the configuration information from the at least one memory device.

7. A re-configurable electronic interface system as in claim 5, wherein the interface controller and at least one memory device communicate via a dedicated serial interface.

8. A re-configurable electronic interface system as in claim 5, wherein the interface controller communicates with a microprocessor.

9. A method of reconfiguring an interface used in a modular electronic architecture between a primary host device and a secondary module device, the primary host device having no prior configuration information pertaining to the secondary module, comprising the steps of:
    providing an interface controller associated with the primary host device;
    reading configuration information from at least one memory associated with the secondary module device;
    setting configurable logic in the primary host device such that an electrical interface is established between the primary host device and the secondary module device; and
    configuring a plurality of pins in the interface to provide capability between the primary host device and the secondary module device.

10. A method of reconfiguring an interface as in claim 9, further comprising the step of:
    self-extracting the configuration information from the at least one memory when the secondary module device is connected with the primary host device.

11. A method of reconfiguring an interface as in claim 9, further comprising the step of:
    communicating between the interface controller and the at least one memory via a dedicated serial interface.

12. A method of reconfiguring an interface as in claim 9, further comprising the step of:
    controlling the interface controller using a microprocessor.

* * * * *